July 1, 1969 A. J. W. M. VAN OVERBEEK ET AL 3,453,553

TWO TRANSISTOR RESONANT CIRCUIT EMPLOYING SERIES DIODE COMPENSATION

Filed Oct. 6, 1965

Sheet 1 of 5

INVENTORS
ADRIANUS J. W. M. VAN OVERBEEK
WILHELMUS A. J. M. ZWIJSEN
BY
Frank R. Trifari
AGENT INVENTORS
ADRIANUS J. W. M. VAN OVERBEEK
WILHELMUS A. J. M. ZWIJSEN
BY
Frank R. Jifani
AGENT INVENTORS
ADRIANUS J. W. M. VAN OVERBEEK
WILHELMUS A. J. M. ZWIJSEN
BY
Frank R. Trifari
AGENT INVENTORS
ADRIANUS J. W. M. VAN OVERBEEK
WILHELMUS A. J. M. ZWIJSEN
BY Frank R. Trifari
AGENT INVENTORS
ADRIANUS J. W. M. VAN OVERBEEK
WILHELMUS A. J. M. ZWIJSEN
BY
Frank R. Trifari
AGENT United States Patent Office
3,453,553
Patented July 1, 1969

3,453,553
TWO TRANSISTOR RESONANT CIRCUIT EMPLOYING SERIES DIODE COMPENSATION

Adrianus Johannes Wilhelmus Marie van Overbeek and Wilhelmus Antonius Joseph Marie Zwijsen, Emmasingel, Eindhoven, Netherlands, assignors, by mesne assignments, to U.S. Philips Corporation, New York, N.Y., a corporation of Delaware Filed Oct. 6, 1965, Ser. No. 493,491
Claims priority, application Netherlands, Oct. 15, 1964, 6411980; Feb. 13, 1965, 6501839
Int. Cl. H03f 3/04
U.S. Cl. 330—21 17 Claims

ABSTRACT OF THE DISCLOSURE

A resonant amplifying circuit including a first transistor with a plurality of compensating diodes in its collector circuit and with its collector directly connected to the base of a second transistor. A phase-shifting capacitive feedback circuit is connected between the emitters of the two transistors, and a capacitor is connected across the plurality of diodes to provide a phase shift that is equal and opposite to the phase shift of the feedback circuit at the resonance frequency of the amplifier. A variable resistance in the emitter circuit of the first transistor allows adjustment of the resonance frequency. The value of the capacitor can be selected to convert the amplifier into a free-running oscillator.

This invention relates to resonance circuits including at least two transistors having emitters, bases, and collectors, wherein the collector of the first transistor is connected to the base of the second transistor, while a phase-shifting feedback coupling is provided between at least one of the remaining electrodes of the second transistor and that of the first transistor. It relates more particularly to circuits by which electrical signals may be amplified or generated selectively without using tuned circuits.

It provides, on the one hand, the possibility of avoiding inductors so that it is highly suitable for being carried out in semiconductor technique (integrated circuit, solid circuit), where the use of inductors invariably causes difficulty and, on the other hand, of varying the resonance frequency or resonance sharpness in a simple, but well reproducible manner.

As is well-known, valve circuits including RC-feedback coupling are in general very sensitive to variations in temperature or supply voltage. Although, as is well-known, transistors show an even considerably higher sensitivity to variations in the ambient temperature, a circuit according to the invention has nevertheless permitted of realizing a high-selectivity amplifier in which variations in the supply voltage and in the ambient temperature have very little influence on the frequency or the selectivity of the amplifier. The invention is characterized in that the collector circuit of the first transistor includes the series-combination of at least two semiconductor diodes polarized in the forward direction, which series-combination has connected to it phase shifting elements such that the phase shift from the collector of the first transistor to the base of the second transistor and that of the phase-shifting feedback coupling are equal but of opposite sign at the resonance frequency of the circuit, while the product of amplification and feedback coupling is at least substantially equal to unity.

The invention is based upon recognition of the fact that by a mode of circuiting such that the direct current flowing through the first transistor and through the diodes is substantially the same, it is achieved that the differential resistance measured at the emitter input of the transistor and across each of the diodes is also the same. From the calculation it appears that the selectivity of the circuit may then become independent of the magnitude of these resistances so that unwanted distortion or self-oscillation of the circuit need not be feared. Furthermore, it is possible in a simple manner to stabilize the resonance frequency of the circuit, as will be explained more fully hereinafter. Also it is possible in a simple manner to vary this resonance frequency and even in a manner such that for a plurality of similar circuits their resonance frequencies are varied simultaneously by means of one vaiable resistor.

In order that the invention may be readily carried into effect, it will now be described in detail, by way of example, with reference to the accompanying diagrammatic drawings, in which.

Figures 1, 2, 3, 4, 5, 6, 7:
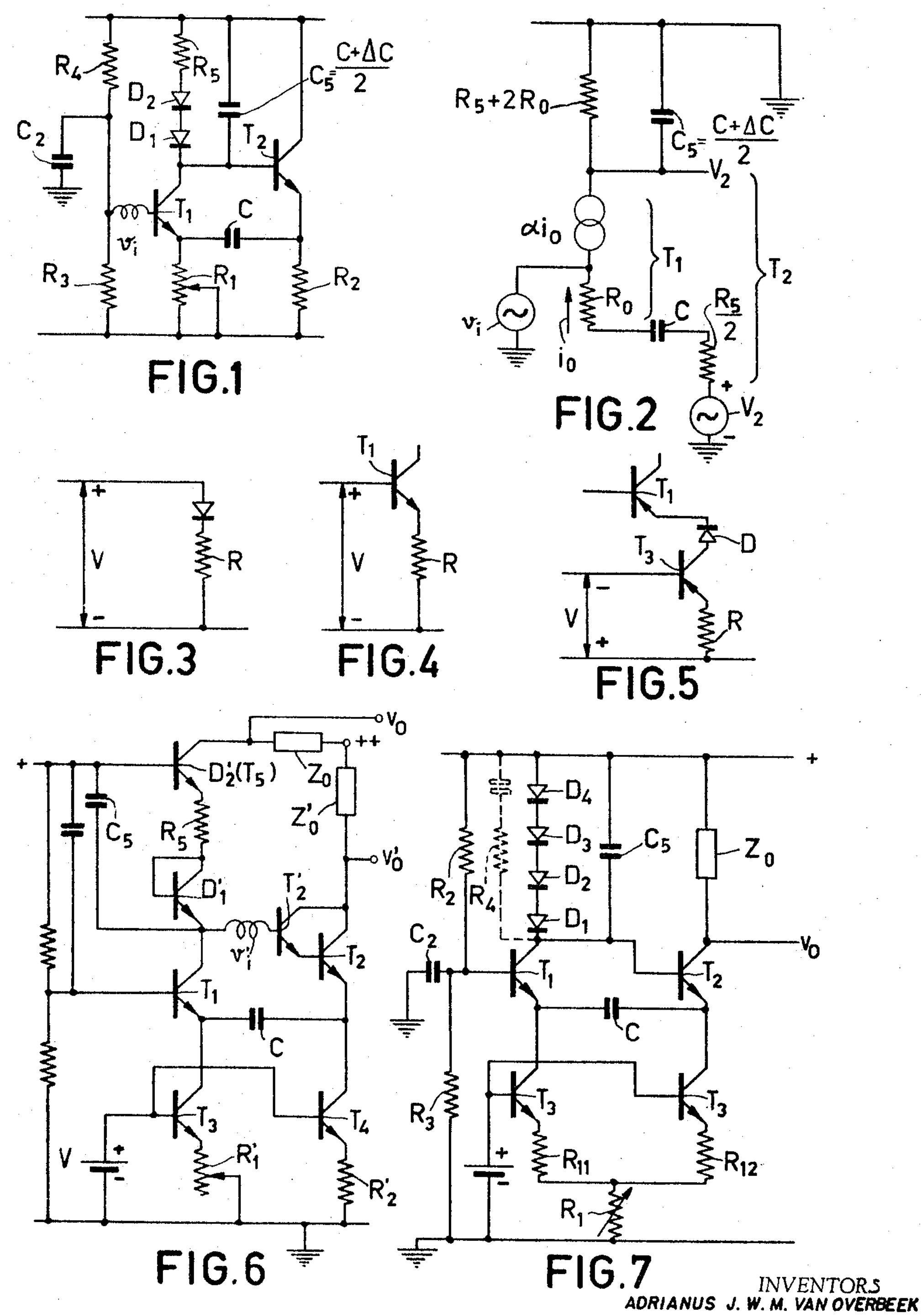
FIGURE 1 shows a circuit diagram of a circuit according to the invention.
FIGURE 2 shows its substitution diagram.
FIGURES 3, 4 and 5 show circuits which serve to explain FIGURE 1.
FIGURE 6 shows a more elaborated embodiment of FIGURE 1.
FIGURE 7 shows another embodiment of a circuit according to the invention.

The amplifying circuit according to the invention shown in FIGURE 1 includes a junction transistor $T_1$ the collector circuit of which includes the series-combination of diodes $D_1$ and $D_2$, polarized in the forward direction, and a resistor $R_5$. Parallel to this series-combination is a capacitor $C_5$ and also a junction transistor $T_2$ the base of which is connected to the collector of transistor $T_1$ and the emitter of which is connected through a capacitor C to the emitter of transistor $T_1$.

FIGURE 2 shows the substitution diagram thereof in which it is assumed that the emitter series-resistors $R_1$ and $R_2$ are such that their influence is negligible, that the base potentiometer $R_3$, $R_4$ is uncoupled for signal oscillations by means of a capacitor $C_2$, that the resistor $R_5$ is adjusted to a value equal to double the emitter input resistance of the transistor $T_2$ (this resistance may be regarded as a constant at a high direct-current adjustment of transistor $T_2$), that the alternating base current of transistor $T_2$ is negligible relative to the alternating collector current of transistor $T_1$, and that the emitter input resistance of transistor $T_1$ is equal to the impedance $R_0$ of each of the diodes $D_1$ and $D_2$, which is the case if the diodes $D_1$ and $D_2$ and the transistor $T_1$ are at the same temperature and operated at the same direct current, for example, if designed as a "solid circuit."

The amplifying junction transistor $T_1$ of the high collector-base current gain factor has a collector impedance, constituted by the parallel-connected circuits $C_5$ and $D_1$–$D_2$–$R_5$. The capacitor $C_5$ has a value:

$$\frac{C+\Delta C}{2}$$

Without feedback coupling the alternating collector voltage of transistor $T_1$ at an input signal voltage $v_i$ is:

$$v_2=v_i\left(\frac{R_5}{R_o}+2\right)f(\omega)$$

where $f(\omega)$ is a function of frequency which is equal to $-j/\sqrt{2}$ ($j$ is the imaginary unit) for the frequency $$\frac{1}{\omega_o}=(R_5+2R_o)\frac{C+\Delta C}{2}$$

The transistor $T_2$ is connected as an emitter follower. The voltage across the base-emitter path of this transistor is replaced by the resistance $R_5/2$ in the substitution diagram of FIGURE 2. The current $i_o$ which flows through $T_1$ thus becomes equal to:

$$i_o=V_2\frac{g(\omega)}{R_o+\frac{R_5}{2}}$$

where $g(\omega)$ is also a function of frequency which is equal to $i/\sqrt{2}$ for:

$$1/\omega_o=(R_5+2R_o)\frac{C}{2}$$

This is equal but opposite to the above-mentioned phase shift.

If $\Delta C$ is small relative to C the product of amplification and feedback at the frequency $\omega_o$ is almost equal to unity so that the effect of this feedback is an increase in gain of the amplifier, which is maximum for a frequency:

$$1/\omega_o^2=\left(R_o+\frac{R_5}{2}\right)^2 C(C+\Delta C)$$

and which has a value smaller than the maximum value by a factor of $\sqrt{2x}$ for frequencies $\omega_o\pm\Delta\omega$, where $$\frac{\Delta\omega}{\omega_o}=\frac{\Delta C}{2C}$$

The value $$\frac{\omega_o}{2\Delta\omega}=Q$$

will therefore be referred to hereinafter as the gain increase factor.

The particular feature of this circuit, which apparently operates as a resonant circuit, is that Q depends not upon the values of $R_o$ or $R_5$ but only upon the ratio $C/\Delta C$ so that Q can be made independent of temperature or of the adjustment of the current of transistor $T_1$. A constant value for Q implies that the risk of unwanted self-oscillation is avoided. If, on the other hand, $\Delta C$ is made negative the circuit will commence to self-oscillate when the product of amplification and feedback factor is again independent of temperature and variations in supply voltage so that an oscillation can be generated which is substantially free from distortion for any adjustment of the frequency produced. Further the frequency $\omega_o$ is adjustable in a simple manner by adjusting $R_o$. This may be effected by control of the direct current flowing through $T_1$, $D_1$ and $D_2$. The resistor $R_5$ serves to compensate for the influence of the emitter resistor of transistor $T_2$. Since the resistor $R_2$ is not variable, $R_5$ may also be a fixed resistor.

In general the differential resistance in the forward direction of an idealized semiconductor diode and also the emitter differential resistance of a transistor are given by the equation:

$$R_o=\frac{KT}{q(I-I_o)}$$

where $R_o$ is the differential resistance, K is the constant of Boltzmann, T is the absolute temperature, $q$ is the charge of the electron, I is the direct current and $I_o$ is the leakage current in the cut-off condition, which latter is in many cases negligible relative to I. If, in addition to a constant selectivity or gain increase Q of the circuit, a constant resonance frequency is desired, it is still necessary to stabilize $R_o$. It will be evident that $R_o$ may be maintained constant as a function of temperature only if I increases in proportion to temperature. This may be achieved by utilizing the fact that the direct voltage across a semiconductor diode, as measured at a constant current, decreases upon increase in temperature. Thus, if a resistor R and a temperature-independent direct voltage source V are included respectively in series with the diode and in the emitter-base circuit of the transistor as shown in FIGURES 3 and 4, the direct voltage across the resistor and the direct current flowing through this resistor will increase upon increase in temperature. By a correct choice of the voltage V of the direct voltage source, the increase in the direct current flowing through the resistor R will be exactly proportional to the absolute temperature T. According to the formula just given, the differential resistance $R_o$ thus becomes substantially independent of temperature over a temperature range which is sufficiently large in practice. Said voltage is approximately equal to the so-called "gap voltage" of the semiconductor material used (for silicon=1.2 volts). If the voltage of the direct-voltage source is not wholly independent of temperature, as is the case, for example, with the voltage of a Zener diode or that of a battery, it is still possible to give the direct voltage V a value such that the temperature dependence of the direct-voltage source is also compensated and $R_o$ becomes substantially independent of temperature. According to FIGURE 5, it is similarly possible to make the direct current flow through other diodes or transistors, the A.C. resistance of which then likewise becomes independent of temperature, provided their temperature is substantially equal to that of the controlling transistor. The transistor $T_3$ in these figures is connected in the same manner as the transistor $T_1$ of FIGURE 4 and will therefore fulfill the function of a high-ohmic current source with a temperature-dependent collector current such that the differential resistances of the series-diode D and transistor T, respectively, again become independent of the ambient temperature and of the collector supply voltage, respectively.

Since both $R_1$ and $_2$ of FIGURE 1 have an interfering action on the gain increase phenomenon (which effect may be compensated, if desired, by giving resistor $R_5$ a value higher than double the emitter input resistance of transistor $T_2$) it is possible to replace $R_1$ and $R_2$ by direct-current sources having high internal AC-impedance. This is shown in FIGURE 6. The transistors $T_3$ and $T_4$ include resistors $R'_1$ and $R'_2$ respectively in their emitter leads. Their bases are connected to earth through the direct-voltage source V. This is chosen to be such that the internal emitter resistances of the transistors $T_3$ and $T_4$ remain constant upon temperature variations. If the temperature of the transistors $T_1$ and $T_2$ varies in the same manner as that of the transistors $T_3$ and $T_4$, the emitter input resistances of these transistors as well as the internal resistances of the diodes $D'_1$ and $D'_2$, which are used as a load of the transistor $T_1$, will also be independent of temperature. The collectors of the transistors $T_3$ and $T_4$ have admittances so low that they do not interfere with the action of the resonance phenomenon.

FIGURE 6 shows several differences with respect to FIGURE 1. The signal energy $v'_i$ is supplied in the lead between the collector of transistor $T_1$ and the emitter follower $T_2$. This affords the advantage that the gain factor is higher and the signal-to-noise ratio is more favourable than in the case where the signal energy is supplied at several other points, for example, between earth and the base of transistor $T_2$ or between earth and one of the emitters. To obtain a high signal-to-noise ratio, it has in general been found most favourable to place the signal source $v'_i$ at any point of the loop formed by the connection from the collector of transistor $T_1$ to the base of transistor $T_2$ and from its emitter back to the emitter of transistor $T_1$ instead of connecting the source $v'_1$ to earth at one end. The source $v'_1$ there prefarably has a low internal resistance which may be matched, if desired.

It appears that the circuit of FIGURE 6 behaves as a series-resonant circuit of high quality with respect to the source $v'_1$. If, therefore, the source $v'_1$ is replaced by a transformer the secondary winding of which is connected in the illustrated manner, an impedance having the character of a series-resonant circuit of high quality is measured between the terminals of the primary winding. Such impedances are very usable for telephone filters. The same property is found when measuring for example in series with the capacitor C of FIGURES 1, 6 or 9, and also for the source $v_1$ of FIGURE 1.

The transistor $T_2$ is preceded by an additional transistor $T_2'$, the emitter of which is connected to the base of transistor $T_2$. The transistors $T_2'$ and $T_2$ thus constitute a combination transistor having an apparently increased base-collector current gain factor. The load of the transistor $T_2$ on the parallel combination of the circuits $D'_1$, $D'_2$, $R_5$ and $C_5$ thus becomes less interfering.

The diode $D'_2$ is formed by the emitter-base path of a transistor $T_5$. This affords the advantage that the collector lead of transistor 5 may include an impedance $Z_o$, which may have the form of a resistor or a plurality of diodes connected in series, from which an output voltage $v_o$ may be derived. The reaction of this voltage on the resonance circuit may be reduced and $v_o$ may be much greater than the voltage at any other point of the circuit. An output voltage may also be derived from the impedance $Z'_o$ in the collector circuit of transistor 2, in which even the advantage of a small reaction on the resonance phenomenon also exists.

Lastly, it should be noted that the diode $D'_1$ can, if desired, also be replaced by a transistor the collector of which is through-connected to the base. This affords the advantage that the high-frequency properties of said diode will be equal to those of transistor $T_1$ by equal choice.

In one embodiment of the invention, the transistors employed were experimental silicon npn-type transistors suitable for use at high frequency (100 mc./s.). The silicon diodes $D_1$ and $D_2$ were arranged on the same semiconductor crystal. The source $V_1$ supplied an approximately 1.4 volt direct voltage. The direct current flowing through the transistor $T_1$ was varied from $50\mu$ amps to $0.54\mu$ amps by control of the resistor $R_1$. The direct current flowing through transistor $T_2$ was 3 ma. The resistor $R_5$ was about 20 ohms. The value of capacitor C was approximately $10^{-9}$ farads. The circuit resonated at frequencies varying from approximately 280 kc./s. to approximately 2 mc./s., dependent upon the adjusted flow of direct current through the transistor $T_1$, at which a value 100 for Q could readily be obtained.

One embodiment of the invention in which the resistor $R_5$ is absent is shown in FIGURE 7. The direct current through the resistor $R_1$ is divided in this example into two currents through resistors $R_{11}$ and $R_{12}$ respectively. If these are iidentical the emitter input resistors $R_o$ of the transistors $T_1$ and $T_2$ are also identical, on the condition that thse transistors are identical. It is now possible to include four diodes $D_1$, $D_2$, $D_3$ and $D_4$ in series in the collector circuit of transistor $T_1$ in order to obtain a resonance frequency: $\omega_o = \frac{1}{2} R_oC$. In the circuit of this figure $C_5$ is chosen to be a little greater than ½C.

This circuit affords the advantage that variations in the input resistance of transistor $T_2$ with temperature (shown as the constant $R_5/2$ in FIGURE 2) are also compensated so that a high resonance sharpness or gain increase factor Q is obtainable over a broad tuning range (variation of $R_1$) without the stabiltiy of the circuit being hazarded. Further it may be advantageous that the transistor $T_2$ can be operated at a direct current smaller than that of FIGURE 1.

It is not strictly necessary that the resistors $R_{11}$ and $R_{12}$ are identical or that the number of diodes $D_1$, $D_2$, $D_3$, $D_4$ is exactly four. If different values for the resistors $R_{11}$ and $R_{12}$ are chosen, $C_5$ must also no longer be equal to ½C. In all cases a resistor $R_4$ may be connected in parallel with one or more diodes, if desired in series with a large capacitor, thus simulating a tunable resonant circuit, the bandwidth of which remains substantially constant over a large tuning range. Solutions may also be obtained by either giving $C_5$ a value a little higher than 2C or including $R_4$. In this case the bandwidth is substantially constant, at low frequencies, while at high frequencies the factor Q is constant, that is to say the bandwidth increases in proportion to the resonance frequency. Such a resistor $R_4$ is shown in broken line in FIGURE 7.

Figure 8:
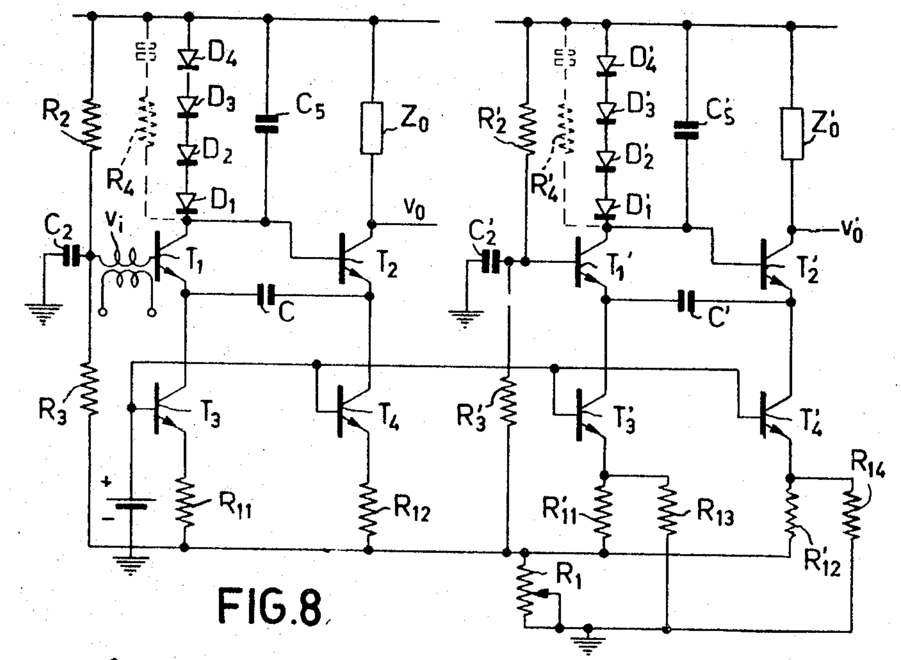
FIGURE 8 shows an application of FIGURE 7.

One of the attractive properties of circuits according to the invention is that several resonant circuits can be tuned simultaneously by means of single variable resistors. The left-hand portion of the circuit of FIGURE 8 is identical with that of FIGURE 7; the right-hand portion (in which the corresponding reference numerals are provided with indexes) includes circuit elements similar to those in FIGURE 7 and has the variable resistor $R_1$ in common with the left-hand portion. However, the values of these circuit elements are chosen to be such that the resonance frequencies of the left-hand and right-hand portions differ slightly. Furthermore, resistors $R_{13}$ and $R_{14}$ are connected in parallel with the resistors $R'_{11}$ and $R'_{12}$ respectively of FIGURE 8. A small percentage deviation of the ohmic values of $R'_{11}$ and $R'_{12}$ from $R_{11}$ and $R_{12}$ gives an equal percentage deviation in the frequency of the associated resonance circuit. A small additional current which is not controlled by the resistor $R_1$ gives a constant frequency difference between the two resonant circuits, independently of the tuning frequency. Such a current is led through the resistors $R_{13}$ and $R_{14}$ of FIGURE 8 to the emitters of the transistors $T'_3$ and $T'_4$.

The latter property is very useful if the circuit according to the invention is used for a superheterodyne receiver. In this case one of the two halves of FIGURE 8 may be caused to oscillate. This oscillating may be obtained, for example, by making $\Delta C$ of FIGURE 1 negative. According to the preceding paragraph the resonance frequencies of a non-oscillating resonance circuit and an oscillating resonance circuit may have a constant difference, irrespectively of the value $R_T$ and hence of the frequencies of the oscillator. In FIGURE 8, for example, the left-hand portion may represent a tuned resonance circuit as shown in FIGURE 7, of which $\Delta C$ is positive and which is thus usable as an amplifier, and the left-hand portion may represent a similar circuit of which $\Delta C$ is a little negative and which is thus self-oscillating. By means of the resistors $R_{13}$ and $R_{14}$ it is achieved that the resonance frequency and the oscillator frequency retain a constant difference upon varying $R_1$. Aerial signals amplified in the left-hand portion of the circuit may subsequently be mixed in known manner with the oscillations generated by the right-hand portion of the circuit, whereafter the resulting intermediate-frequency oscillations are filtered out and dealt with further.

A large number of other embodiments of the invention are possible in addition to those previously mentioned. They all correspond with one another is that the collector circuit of at least one transistor is formed by a series-combination of at least two diodes in conjunction with a phase-shifting reactive element and that the feedback path to the base-emitter circuit of the said transistor includes a similar reactive element which gives a phase shift opposite to that of the first-mentioned phase-shifting element, the opposite phase shifts being exactly equal for one frequency (the resonance frequency) and the loop gain for this frequency being equal or substantially equal to unity.

Figure 9:
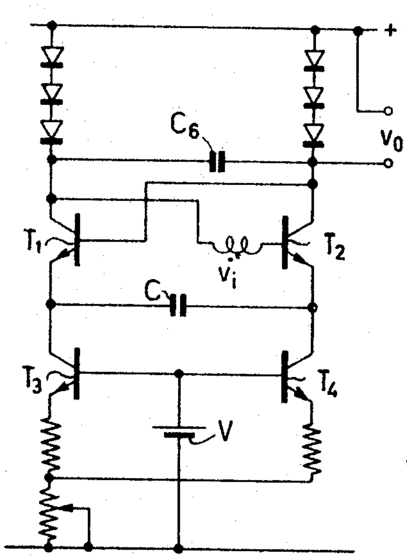
FIGURES 9, 10 and 13 show variants of FIGURE 7.

Another embodiment is shown in FIGURE 9. The current flowing through the transistors $T_1$ and $T_2$ is now controlled by the transistors $T_3$ and $T_4$. The collector load of each of the transistors $T_1$ and $T_2$ is formed by a number of diodes connected in series. If this number is three the capacitor $C_6$ between the collectors of the transistors $T_1$ and $T_2$ must be approximately 6 times as large as the capacitor C between the two emitters. In case of four diodes in series, $C_6$ must be approximately 4 times as large as C. The feedback path is now from the collector of transistor $T_1$ to the base of transistor $T_2$ and from the collector of transistor $T_2$ to the base of transistor $T_1$. This circuit has, as compared with those of FIGURES 6 and 7, the advantage that, in addition to the supply voltage, only one direct voltage is needed, namely the base-bias of the transistors $T_3$ and $T_4$. The base potentiometers $R_3$, $R_4$ of FIGURE 1 has therefore become redundant, which constitutes an important advantage for a solid circuit. Further, in this circuit, the difference between the currents flowing through the transistors $T_3$ and $T_4$ has, to a first approximation, no influence on the magnitude of the selectivity. The input energy may be supplied, for example, at point $v_i$ and the output voltage may be derived from the terminals $v_o$.

Figure 10:
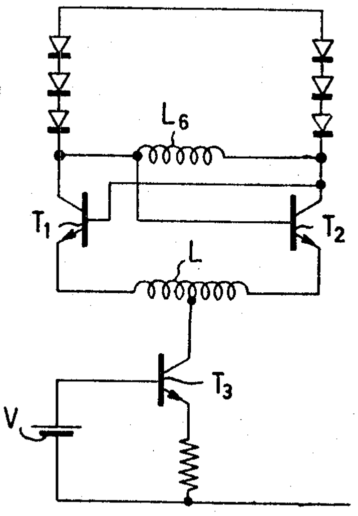

FIGURE 10 shows a circuit in which the reactive elements are inductors which otherwise quite correspond in operation to the circuit of FIGURE 9. When using three diodes an inductor $L_6$ is required, which is approximately equal to 6L. This circuit affords the advantage that only one transistor $T_3$ is needed for the control of frequency. Circuits including inductors usually have the disadvantage, however, that they cannot be realized so easily in solid technique.

In principle the reactive elements C, $C_5$, $C_6$ and L, $L_6$ respectively may be replaced by combinations of capacitors and inductors, provided the resonance frequencies of these combinations lie outside the range in which the circuit must show resonance. The inductors and capacitors obtained in practice are already resonant elements in way, but their resonance frequencies fall far beyond the range of utilisation, so they they may still be regarded as pure inductors or capacitors.

It is not necessary for the second phase-shifting element to be included between the emitters of the transistors $T_1$ and $T_2$. The phase-shift may be divided over several circuits.

Figure 11:
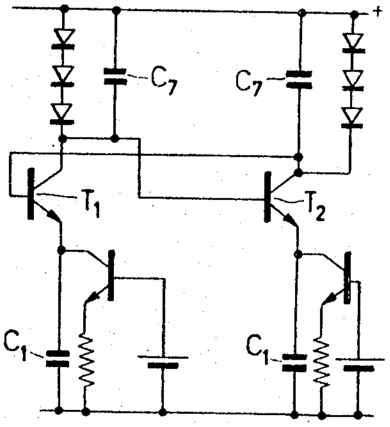
FIGURE 11 shows yet another embodiment of a circuit according to the invention.

An example thereof is shown in FIGURE 11. In this circuit the emitter leads include the capacitors $C_1$ and the collector leads include, in parallel with the series-connected diodes, capacitors $C_7$.

Due to the low forward resistances of the diodes, the collector circuits of the transistors may be regarded as voltage sources having low internal resistances. The presence of $C_1$ results in the emitter current lagging with respect to the voltage between base and earth. The presence of $C_7$ results in the voltage between the collector and earth leading with respect to the collector current and hence the emitter current. The two phase shifts are equal and the loop gain is substantially equal to unity at the resonance frequency.

Figure 12:
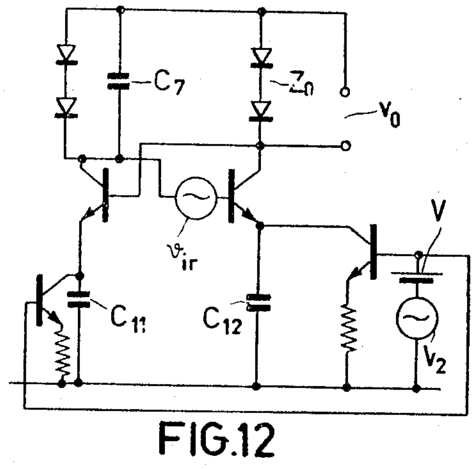
FIGURE 12 shows a variant of FIGURE 11.

In FIGURE 12, two phase-shifting elements are active in the feedback path, namely capacitors $C_7$ and $C_{12}$. A capacitor $C_{11}$ has so high a capacitance that its phase shift is negligible. In this circuit, which may be used either as an oscillator or as a selective amplifier, the resonance frequency may be varied by a voltage source $V_2$ in series with the direct voltage source V. Thus either a frequency-modulated signal may be produced or a filter of varying resonance frequency is obtainable, which may otherwise be realized with all the circuits described.

Figure 13:
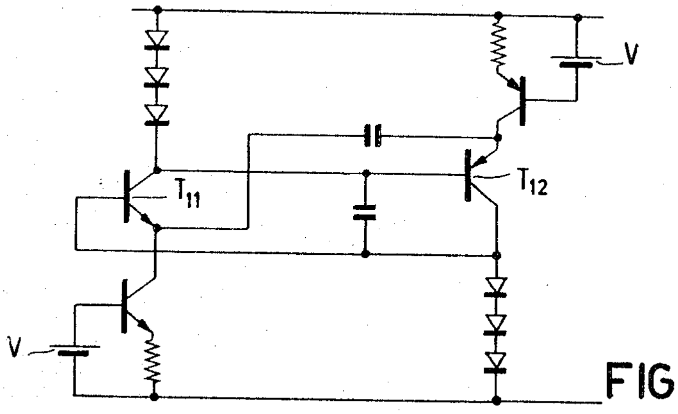

The invention is not limited to the use of transistors of one polarity. Combinations of pnp-type and npn-type transistors may also be used in the loop gain circuit. An example thereof is shown in FIGURE 13. A transistor $T_{11}$ is now of the npn-type and a transistor $T_{12}$ is of the pnp-type. The circuit otherwise corresponds to that of FIGURE 9. All other circuits may be converted in a similar manner into circuits using combinations of the npn-type and pnp-type transistors.

Figure 14:
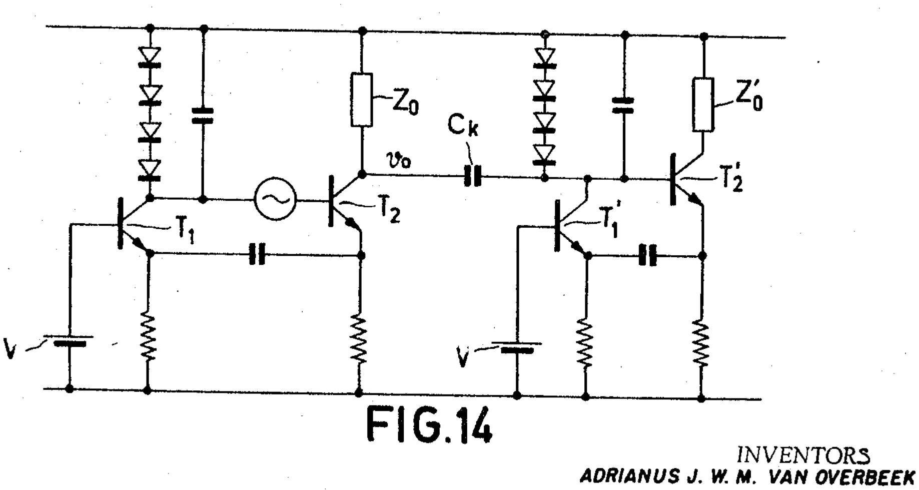
FIGURES 14, 15 and 19 show further uses of FIGURES 6 and 7, respectively.

The resonant circuits of FIGURE 6 may be coupled together in different ways either by active or passive components. It has previously been stated that output voltages $v_o$ and $v_o'$ may be derived from impedances $Z_o$ and $Z_o'$ respectively (FIGURES 6 and 7). A portion of this voltage $v_o$ may be transferred, according to FIGURE 14, by capacitive coupling $C_K$ to a suitable point in the second resonant circuit which is thus excited. In this case substantially only signal energy passes from the first resonant circuit to the second, but substantially no signal energy passes from the second resonant circuit to the first. The sources V in the base leads of the transistors $T_1$ and $T_1'$ respectively are shown as separate sources for the sake of clarity, but are actually combined to form one source, possibly a Zener diode.

Figure 15:
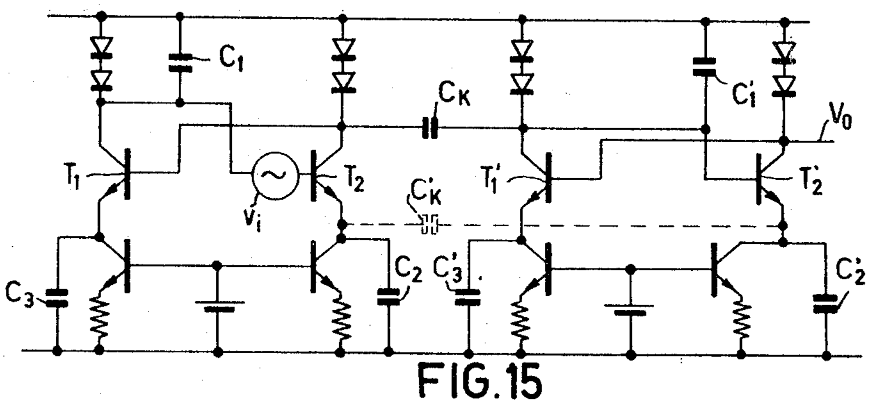

However, it is also possible to couple together two resonant circuits. An example thereof is shown in FIGURE 15. The coupling capacitor $C_K$ may be so chosen as to obtain a so-called critical coupling. To this end, the impedance of $C_K$ must be equal to the resonance impedance of the apparent resonance circuit at the point where $C_K$ is connected to the circuit. This point may also be, for example, the emitter of the second transistor, $T_2$ or $T_2'$, as shown by a connection in broken line in FIGURE 15.

With the coupling of resonant circuits according to the invention it is possible to use staggering in the same manner as is known for LC-circuits. The values of the resonance frequencies and of the Q-factors of the circuits may be so chosen as to obtain a response curve of a given desired shape.

Figure 16:
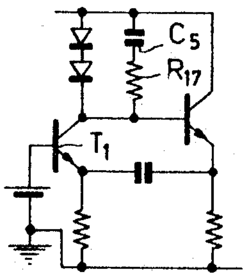
FIGURE 16 shows a variant of FIGURE 1.

At high frequencies, the influence of the capacitance between the emitter and the base of the transistor $T_1$ is felt as interfering. From a calculation it follows, and this is confirmed by measurements, that this influence may be compensated by an additional resistor $R_{17}$ in series with the capacitor $C_5$ of FIGURE 1, as shown in FIGURE 16. The resistor $R_{17}$ must have a value approximately such that $C_5$, $R_{17}$ is equal to the product of emitter input resistance and emitter capacitance of transistor $T_1$.

Figure 17:
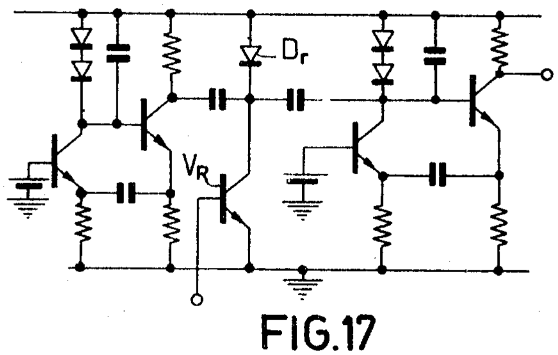
FIGURE 17 shows an application of FIGURE 1.

In a wireless or television receiver using these resonance circuits it is possible to obtain automatic volume control by coupling the circuits to active components the gain of which is controlled in known manner, or to passive components the impedance of which is controlled in known manner. FIGURE 17 shows an example thereof. The impedance of a diode D*r* is controlled by a transistor $V_R$. The base voltage thereof determines the direct current flowing through the transistor, and hence the extent of coupling between the two resonant circuits.

In a receiver using this circuit as the local oscillator, there may be need for automatic control of the frequency of this oscillator under the influence of the detected voltage. This may be effected in a simple manner by causing, for example, the instantaneous value of the voltage in the illustrated circuits to depend upon the detected signal. Also it is possible, for example, to place the resistor $R_1$ in the various circuits by a light-dependent resistor on which an amount of light dependent upon the required frequency sweep is thrown.

One of the possibilities of use of the circuit is a wireless receiver which can receive several wave-bands by adjusting only a single variable resistor. In this case there may be need for remote control, which may be obtained in a simple manner by means of a long double lead to the tuning resistor.

Figure 18:
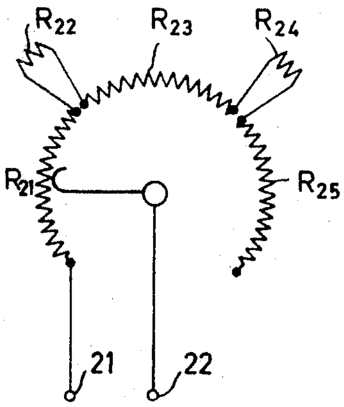
FIGURE 18 shows an embodiment of a variable resistor for use in circuits according to the invention.

The variable resistor $R_1$ in the various circuits shown may be such that certain frequency bands are shortened or lengthened or cannot be received at all. FIGURE 18 shows diagrammatically an embodiment of a resistor with which the latter effect may be obtained. A sliding contact 20 moves successively along resistors $R_{21}$, $R_{23}$ and $R_{25}$. Thus the resistance measured between terminals 21 and 22 may vary between, for example, 0 to 100 ohms upon control along resistor 21, then abruptly jump to the value 300 ohms upon reaching the resistor $R_{23}$ ($R_{22}$ is thus 200 ohms), then vary between, for example, 300 and 1000 ohms and lastly between, for example, 1,200 and 2,000 ohms ($R_{24}$ is thus likewise 200 ohms). These ohmic values may be chosen so that only the various wavebands are traversed.

It is also possible to vary the selectivity of the resonant circuits by slightly varying the capacitances, the inductances or the resistances. If, for example, a capacitive oscillation pick-up or microphone is connected in parallel with the capacitor $C_5$, then not only the resonance frequency but especially also the gain increase factor Q of the circuit will greatly vary. This results in modulation of the high-frequency input oscillation as a function of the capacitance of the pick-up or microphone so that, after detection, an amplified oscillation is obtained. If a negative value for $\Delta C$ is chosen so that the circuit oscillates, then a control voltage may be derived from the oscillator amplitude after detection, which control voltage causes automatic volume control of the oscillator amplitude, for example, in the manner described with reference to FIGURE 17. It is similarly possible to vary the resistor $R_1$ or $R_1'$ as a function of a signal to be amplified and detect the resulting oscillation which is modulated in strength and frequency.

Figure 19:
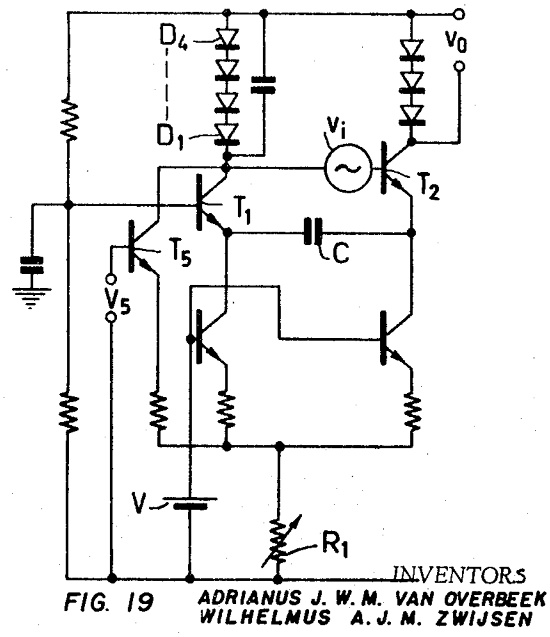

An example of a variation in selectivity by varying the resistances is shown in FIGURE 19. This circuit, in which the same frequency control is used as in that of FIGURE 7, differs from this circuit only in minor points. The particular feature is that part of the current flowing through resistor $R_1$ is tapped independently of the transistors $T_1$ and $T_2$, respectively, and supplied directly through a transistor $T_5$ to the series-combination of the diodes $D_1 \ldots D_4$. This current is small relative to the total current flowing through resistor $R_1$. The resistances of the diodes are thus varied so that, if their resistance is decreased by a factor of $1-a$ ($a$ being a number which is small relative to unity), the resistance in the circuit formed by the two emitter resistors of $T_1$ and $T_2$, which are coupled to the capacitor C, is increased by a factor of $1+a$, so that the product remains substantially constant and hence the resonance frequency. To this end, a portion $a$ is extracted from the emitter currents of $T_1$ and $T_2$ and supplied through transistor $T_5$ to the diodes $D_1 \ldots D_4$. Since the diodes convey only half the total direct current through the two transistors $T_1$ and $T_2$, the result is an increase in the diode current by a factor of $1+a$, so that the resistance of the diodes is reduced by a factor of $1-a$. The control voltage $V_5$ required to bring about this variation in the diode current may be supplied to the base of transistor $T_5$. Since upon variation in selectivity the gain also varies, this control voltage may also be used for automatic control of the amplification.

If a filter having a very sharp frequency characteristic is desired, or if the external conditions vary greatly, the described means of stabilizing the quality factor Q may still be found inadequate. In this case an improved stabilisation may be obtained as follows:

Two substantially identical circuits according to the invention are included either in a single crystal circuit or in an apparatus at points where the ambient temperature of the two circuits is always substantially the same. Their supply voltages are also derived from the same source. The circuits will thus equally react to external conditions such as temperature, humidity, etc. One of the two circuits is so proportioned as to become self-oscillating. A voltage controlling the quality factor Q is applied to either circuit. This voltage is derived from a detector coupled to the output of the oscillating one of the circuits. It controls the quality factor Q in he sense tha Q is decreased upon increasing amplitude of the oscillation. The conditions for this circuit thus invariably are such that the condition for oscillation is exactly fulfilled. The same control voltage is also applied to the other, almost identical circuit. However, this circuit is designed so that the conditions of oscillations are just a little more unfavourable than for the oscillating circuit previously mentioned. This circuit will therefore just not oscillate but rather constitute a filter of a high quality factor Q. If, upon changing external conditions, the feedback factors for the two circuits would tend to vary the oscillation amplitude of the oscillating one of the circuits will vary. The control voltage thus produced controls the quality factors of the two circuits so that both the oscillating circuit and the non-oscillating circuit are stabilized.

The circuits so far described have the disadvantage that the signal amplitude permissible across the diodes without a risk of distortion is comparatively small, namely of the order of a few tens of millivolt. To mitigate this disadvantage, a resistor $R_5$ may be connected in series with the diodes $D_1$ and $D_2$ in FIGURE 20, which resistor $R_5$ is given a value considerable higher than that of the corresponding resistor $R_5$ of FIGURE 1, while a resistor $R_{20}$ is connected in series with the capacitor C. With the same D.C. adjustment of the transistors $T_1$ and $T_2$ by means of the transistors $T_3$ and $T_4$, the resistor $R_5$ must have in practice double the value of that of resistor $R_{20}$. By giving the resistor $R_5$ a value considerably higher than the forward resistance $R_0$ of the diodes, for example, 10 times higher, a considerably higher alternating voltage is permissible at the collector of transistor $T_1$, before risking distortion due to the curved characteristic of the diodes. Although the possibility of varying the resonance frequency of the circuit by varying the adjusting current is thus impeded, this is not objectionable in the intermediate-frequency portion of a receiving circuit since a fixed tuning is usually employed in this portion.

Figure 20:
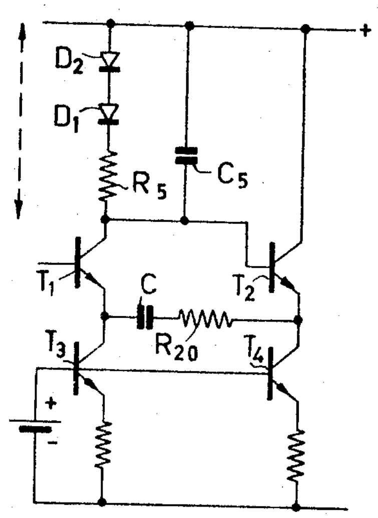
FIGURES 20 to 22 show variants of FIGURE 1 for a fixed tuning frequency and comparatively strong signals.
Figure 21:
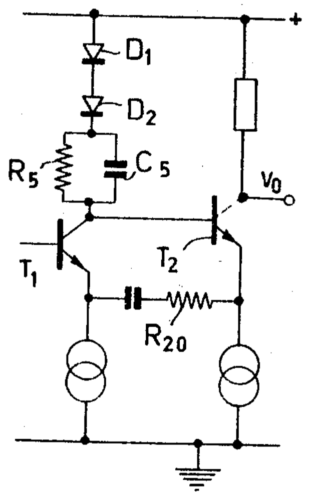
Figure 22:
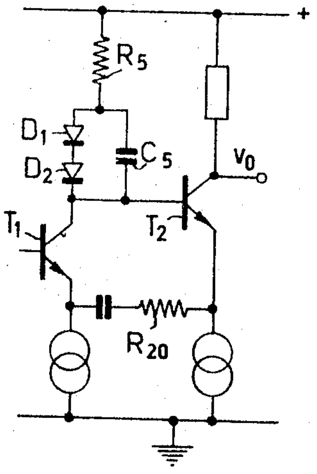

As a variant of the circuit shown in FIGURE 20, the capacitor $C_5$ may be connected at will in parallel with either the resistor $R_5$ or the diodes $D_1$ and $D_2$, as shown in FIGURES 21 and 22 respectively. The resistors $R_1$ and $R_2$, respectively, from FIGURE 1 and the transistors $T_3$ and $T_4$, respectively, from FIGURES 6 and 7 are shown in FIGURES 21 and 22 as current sources the internal resistances of which are high relative to the emitter input resistances of the transistors $T_1$ and $T_2$ respectively. These variants are based upon the recognition that, at the resonance frequency of the circuit, the impedance formed by the parallel combination of the resistance $R_5+2R_o$ and the capacitor $C_5$ of FIGURE 2 and the impedance formed by the series-combination of the resistance $R_5/2$ and $R_o$ and the capacitor C shows substantially equal magnitude but opposite signs; by connecting a further impedance in series with each of said impedances the condition of resonance does not change at all since the current $i_o$ in FIGURE 2 sets up an amount of voltage across this extra impedance which is exactly equal to the amount by which the voltage of the source $V_2$ in FIGURE 2 is increased, thereby assuming that the emitter-collector current gain factor $\alpha$ is equal to unity.

If, with adjustment of a constant current of transistor $T_2$, its emitter input resistance is still important it is necessary for the resistor $R_5$ in the circuit of FIGURE 20 to be approximately double the sum of this emitter input resistance of transistor $T_2$ and the resistor $R_{20}$. In FIGURE 22, $R_5$ must be approximately equal to the sum of the emitter input resistance of transistor $T_2$ and the resistor $R_{20}$. FIGURE 21, however, lends itself best for D.C. adjustment of the transistors $T_1$ and $T_2$. If, in FIGURES 20 and 22, the transistor $T_2$ is adjusted to the same direct current as is the transistor $T_1$, the series-combination in the collector circuit of the transistor 1 must be extended to four instead of two diodes in the same manner as has been described with reference to FIGURES 6 and 7.

What is claimed is:

1. A resonant circuit having an amplification to feedback ratio of substantially unity comprising two transistors each having emitter, base and collector electrodes, means connecting the collector of the first transistor to the base of the second transistor, first phase-shifting means feedback coupling at least one of the remaining electrodes of the second transistor and a corresponding electrode of the first transistor, at least two semiconductor diodes connected in series in the same polarization direction as said first transistor and connected to said collector electrode of said first transistor, second phase-shifting means coupled to said series connected diodes for shifting the phase of a signal between the collector of the first transistor and the base of the second transistor, said first and second phase shift being of equal but opposite sign at the resonance frequency of the circuit.

2. A circuit as claimed in claim 1 wherein a biasing potential approximately equal to the gap voltage of the semiconductor material of said first transistor is applied to the base thereof, and the emitter lead thereof includes a resistor which is high-ohmic relative to the internal emitter input resistance of said first transistor.

3. A circuit as claimed in claim 2 wherein the resistor in the emitter lead of the first transistor is adjustable whereby the resonance frequency of the circuit may be adjusted.

4. A circuit as claimed in claim 3 wherein said resistor is a light-dependent resistor.

5. A circuit as claimed in claim 1 further comprising a resistor approximately equal to double the internal emitter input resistance of the second transistor included in series with the said diodes.

6. A circuit as claimed in claim 5 wherein the direct current flowing through the second transistor is approximately equal to that flowing through the first transistor, and that the said series-combination comprises at least three diodes.

7. A circuit as claimed in claim 6 wherein the transistors are adjusted to approximately equal direct currents, the said series-combination comprising four diodes.

9. A circuit as claimed in claim 1 wherein said phase-shifting feedback coupling comprises a capacitor connected between the emitters of the first and the second transistor.

10. A circuit as claimed in claim 9, wherein a resistor is connected in series with the said capacitor, a corresponding resistor being included, in series with the diodes, in the collector circuit of the first transistor.

11. A circuit as claimed in claim 1 wherein said phase-shifting feedback coupling comprises an inductor included between the emitters of the first and second transistors.

12. A circuit as claimed in claim 11, wherein a tap on said inductor is connected through the collector-emitter path of an auxiliary transistor to a point of constant potential.

13. A circuit as claimed in claim 10, wherein the emitter leads of the first and the second transistor include a plurality of auxiliary transistors connected as high-ohmic differential resistors.

14. A circuit as claimed in claim 13 wherein a voltage approximately equal to the gap voltage of the semiconductor material of the plurality of auxiliary transistors is applied from a common source to the bases of these auxiliary transistors.

15. A circuit as claimed in claim 1 wherein the collector of the second transistor is back-coupled to the base of the first transistor, and the collector circuit of the second transistor also includes the series-combination of at least two semiconductor diodes polarized in the forward direction.

16. A circuit as claimed in claim 15 wherein each of the series-combinations of said diodes is shunted by a capacitor.

17. A circuit as claimed in claim 16 wherein a low-value resistor is connected in series with said capacitor.

References Cited

UNITED STATES PATENTS 3,239,778 3/1966 Rywak ------------- 331—113

ROY LAKE, *Primary Examiner.*

SIEGFRIED H. GRIMM, *Assistant Examiner.*

U.S. Cl. X.R.

325—430; 330—18, 24, 26, 31, 137; 331—108, 113, 135; 333—70